United States Patent [19]

Ensminger

[11] 4,287,766
[45] Sep. 8, 1981

[54] INSPECTION OF SOLDER JOINTS BY ACOUSTIC IMPEDANCE

[75] Inventor: Dale Ensminger, Columbus, Ohio

[73] Assignee: Battelle Development Corporation, Columbus, Ohio

[21] Appl. No.: 78,958

[22] Filed: Sep. 26, 1979

[51] Int. Cl.³ ............................................. G01H 13/00
[52] U.S. Cl. ..................................................... 73/582
[58] Field of Search ............. 73/588, 582, 801, 150 A, 73/572, 620

[56] References Cited

U.S. PATENT DOCUMENTS

| | | | |
|---|---|---|---|
| 3,106,838 | 10/1963 | Crooks | 73/588 |
| 3,857,279 | 12/1974 | Salzer et al. | 73/582 |
| 4,090,400 | 5/1978 | Vahaviolos | 73/582 X |

Primary Examiner—Jerry W. Myracle
Attorney, Agent, or Firm—Barry S. Bissell

[57] ABSTRACT

A method for detection of unacceptable solder joints, especially solder pads on printed circuit boards (PCBs), by means of the application of acoustic vibrations over a range of frequencies to the solder joint and observation of the acoustic impedance of the joint as reflected back through the driver to the acoustic generator or through an acoustic detector near the generator to electrical detecting apparatus.

7 Claims, 4 Drawing Figures

INSPECTION OF SOLDER JOINTS BY ACOUSTIC IMPEDANCE

BACKGROUND OF THE INVENTION

In my copending U.S. Pat. application Ser. No. 943,447, filed Sept. 18, 1978, now U.S. Pat. No. 4,218,922 I described two methods for detecting flaws or unacceptable conditions in solder joints wherein an acoustic signal, with or without an electrical current, was applied on one side of a solder joint, passed through the joint, and received on the other side. The input was modulated by the joint and a comparison between the modulated output and the input was used to identify bad solder joints.

It occurs many times that a discrete element or integrated circuit is soldered by its lead wires to a conductor pad on a printed circuit board wherein the "other side" of the solder joint is inaccessible. For example, this is the case where the lead is soldered to a conductor pad which passes through the substrate to connect elements on the other side. Therefore, it would be beneficial to have a non-destructive testing method whereby the test could be run on the solder pad itself. Common ultrasonic flaw detectors which apply an acoustic wave to the joint and receive back an echo from the flaw are good for some flaws but not for others which are more subtle.

SUMMARY OF THE INVENTION

It is an object of the invention to provide a nondestructive, qualitative method of detecting unsatisfactory solder joints in electrical devices.

It is also an object of the invention to provide a method which is quick and reliable and which can be easily automated.

It is also an object to provide such a method which can be used with a wide variety of flaws and unsatisfactory bonding.

It is an object to provide an inspection method which can be applied to but one lead of the solder joint or merely to the joint itself.

In accordance with the objectives, the invention is an acoustic method for flaw detection in solder joints. The method utilizes the characteristic acoustic impedance of the solder joint which modulates an applied acoustic wave and is observed by a receiving transducer. The electrical impedance of the receiver as affected by the acoustic impedance of the solder joint is monitored over a range of applied frequencies giving a description of the impedance as a function of frequency. This impedance/frequency description is also known herein as the spectral response and is a graphic representation of the condition of the solder joint.

The method for inspection of defects in a solder joint comprises applying an acoustic vibration to the solder joint, sweeping over a frequency range which preferably falls within the limits of 20 hz to 1 Mhz, or more preferably sweeping over a range of 150 khz–650 khz. The frequency range should include at least one, and preferably more than one, natural resonant frequency of the solder joint. The acoustic vibrations pass through or are reflected back from the solder joint and are modulated thereby. The vibrations are then received by a receiving transducer which is capable of converting the vibrations into electrical signals. The electrical impedance of the receiver (which is affected by the acoustic impedance of the solder joint) is then observed as a function of applied frequency (the spectral response) and compared to standard spectral responses of known unacceptable or acceptable solder joints whereby the latter are used to characterize the tested solder joint as unacceptable or acceptable.

The acoustic driver applying the acoustic energy and the receiver may be the same device in which case the reflected impedance will be observed. The receiver may alternatively be a second transducer located either near the driver or on the other side of the solder joint. Preferably the receiver and the driver are separate elements but are both contacted directly with the solder joint as far as possible apart during inspection.

DETAILED DESCRIPTION OF THE INVENTION

Figure 1:
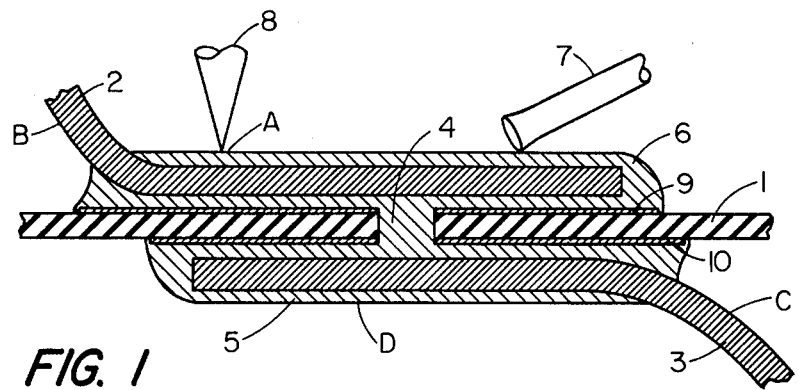
FIG. 1 shows an ultrasonic receiver and driver for testing a solder joint.

In FIG. 1, an insulating substrate 1 is shown with a conductive feed-through 4 connecting metal conductor layers 9 and 10 on opposite sides of the substrate. Wires 2 and 3 are respectively soldered to the metal conductor layers 9 and 10 by solder joints 6 and 5.

Acoustic transducer or driver 7 is used to apply an acoustic vibration to the solder joint 6 to test whether joint 6 is acceptable. The transducer is connected to a conventional acoustic generator (not shown). The transducer may be piezoelectric, magnetostrictive, or electromagnetic. These are preferably used for inspection at high, intermediate, and low frequencies, respectively. The invention may be used over a wide range of frequencies which is dependent mainly on the type and sensitivity of the solder joint and wire leads. Miniaturized, sensitive joints and leads may dictate the use of frequencies in the 1 Mhz range, whereas ordinary, heavier-wire joints may dictate the use of from about 20 hz–200 khz. Frequencies swept over a range of 150–650 khz were found most useful in the course of experimenting with the invention.

Returning to FIG. 1, acoustic driver 7 is shown at the toe end of the lead wire 2 and acoustic receiving means 8 is shown near position A at the heel end thereof. This is the preferred location of the driver and receiver in order to make more reliable comparisons of one joint with others. Coupling of the receiver to the solder joint constitutes an acoustic impedance and should therefore be kept constant from sample to sample in order that it can be ignored in the comparison. Constant loading force should be applied to the receiver at the location at A which is the most stable on the joint. Other positions for the receiver, such as B or even C and D, may be used if necessary, however, they are not preferred. Positions C and D would also involve interference of the impedance of solder joint 5 into the independent observation of the impedance of solder joint 6.

The coupling of the receiver to the joint should be under modest pressure. If the driver has a high impedance compared to the joint, defects will be difficult to detect in a tightly coupled system. On the contrary, if coupling is too light, only a small amount of energy can be transferred to the joint and sensitivity will be low.

The receiver 8 may be a conventional transducer pickup which is responsive to acoustic impedance and broad-band input. A high-resolution spectrum analyzer may be used to display or record impedance data for manual inspection or to feed data to processing means for automated operation. The receiver should be responsive to input frequencies over the 20 hz–1 Mhz range.

DESCRIPTION OF THE PREFERRED EMBODIMENTS

Printed circuit boards, each comprising a substrate and 20, 14-lead flat packs (integrated circuit elements) were prepared incorporating a variety of known defects such as inclusions, cold solder, voids, dewetting, poor filleting, excessive solder, insufficient solder, gold entrapment, bent lead, cracks, etc. Good solder joints were also prepared as standards. A setup such as shown in FIG. 1 was used to apply vibrations to the individual solder joints over a sweep of frequencies in the range of 150 khz–650 khz. The receiver and driver were located as shown in FIG. 1. The spectral responses obtained over the 150 khz–650 khz sweep (see FIGS. 2–4), show that major resonant frequencies in the transmitter were present at about 200 khz, 270 khz, and 520 khz.

The equipment used for testing were:

(1) A Wavetek 114 Sweep frequency generator to drive the acoustic transducer through a range of frequencies;

(2) A Tektronix 434 Storage oscilloscope for monitoring the voltage to the driver. Voltage was about 1 volt peak-to-peak to keep the stress on the solder to less than 1 psi;

(3) A Tektronix 7L5 Spectrum analyzer (associated with the receiver 8) and a Tekronix 7613 oscilloscope for monitoring the response of the system.

The principle on which the invention relies is that each solder joint presents the inspection apparatus with electrical properties (particularly impedance) characterizing the physical condition of the joint. Observation and comparison of the impedance at various frequencies with that of known solder joints enables the characterization of the sample solder joint consistent with previously known similar joints.

For example, one mechanism of response of the lead wire and solder joint (as shown in FIG. 1) to the vibrations may be related to the behavior of an elastic rod constrained along its length. If the rod is long and slender and constrained to eliminate flexural modes, it will act like a mechanical filter to pass only those signals at frequencies at or near its longitudinal resonances. Hence, as the frequency of the applied wave sweeps through at least one resonant frequency of the joint, a peak will occur in the spectral response (impedance versus frequency) curve. The shapes and heights of the resonance peaks will be a function of the conditions of the lead and the joint. Losses at grain boundaries and interfaces between solder and inclusions or voids, will affect the shape. Defects which affect the stiffness of the joint will also affect amplitude of the spectral curve. Generally the broadened peaks indicate unsatisfactory conditions in the solder joint. Depressed peaks at the lower frequencies and magnified peaks at the higher frequencies also seem to indicate unsatisfactory conditions in the joint.

Figure 2:
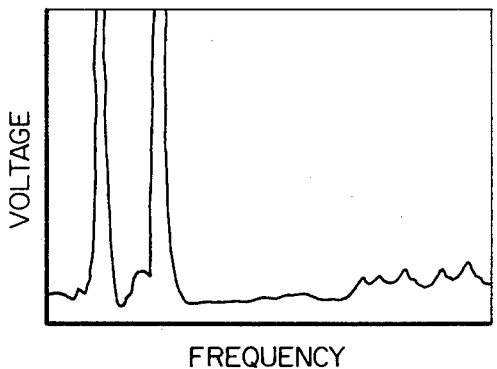
FIG. 2 shows the spectral response of the receiver output for a good joint.

FIG. 2 shows a typical spectral response of the output impedance (as measured by the voltage drop) of the receiver in the inspection of some good solder joints as the acoustic transducer applies vibrations to the solder joint in a sweep over the range of 150 khz–650 khz. The two peaks on the left are at about 200 khz and 270 khz. Several small peaks appear in the 520 khz area.

Figure 3:
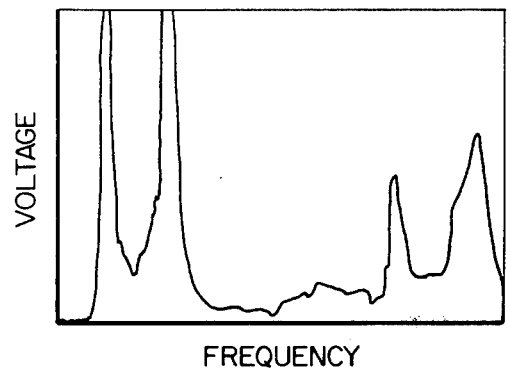
FIG. 3 shows the spectral response of a joint containing minor inclusions.
Figure 4:
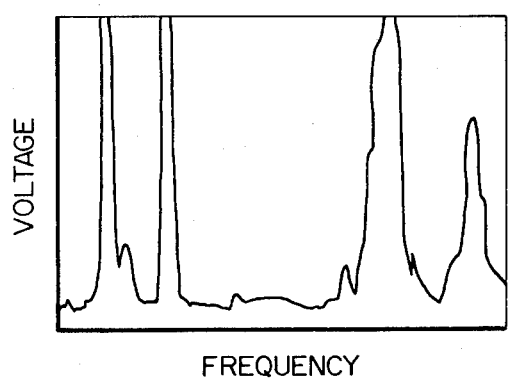
FIG. 4 shows the same effects due to a crack in the solder joint.

The spectral responses of some defective solder joints are shown in FIGS. 3 and 4. The curves selected represent rather extreme cases. Other marginally defective joints may produce spectral responses that are not always significantly different from the good responses making it appear that the test is very subjective. However, we believe that this is occasioned only somewhat by the apparatus limitations and the test itself but probably more by the limitations in manually preparing the "good" and "bad" samples. In other words, some of the attempts at making good and bad samples actually did not produce the desired good or bad joint. The test appeared to be a more accurate indicator of good and bad joints than the preparation method was at preparing samples. The fact remains that the test easily identified severe defects and apparently identified marginally defective joints with good accuracy.

FIG. 3 shows the spectral response of a joint containing minor inclusions. The broadening of the 200 and 270 peaks as well as the much greater effect on the amplitude of higher frequency peaks is evident.

FIG. 4 also shows the same effects due to a crack at the heel of the lead in the solder joint. The stiffness has been severely reduced causing a large increase in amplitude of the higher frequency peaks.

The samples tested were fairly light leads and appeared to be most responsive to frequencies in the neighborhood of 500–600 khz. Other lead sizes and solder joints might require lower or higher ranges to be responsive.

The spectral responses of solder joints are truly characteristic of the conditions therein but the difference between the responses of a good joint and a bad joint can be subtle for some joints which are close in their degree of defect. Classifying the joint condition is therefore largely a matter of learning and experience on the part of the operator of the testing equipment. The experienced operator can use this test to identify poor solder joints with a high degree of accuracy.

I claim:

1. A method for qualitatively inspecting the integrity of a solder joint joining first and second conductors comprising
   (a) applying acoustic vibrations to the solder joint over a range of frequencies which includes at least one natural resonant frequency of the solder joint,
   (b) receiving the acoustic vibrations, as modulated thereby, from the solder joint with a receiving transducer converting acoustic vibrations into electrical signals,
   (c) observing the spectral response of the receiving transducer, and
   (d) comparing the spectral response of the receiving transducer with previously determined spectral responses characteristic of either unacceptable or acceptable solder bonds whereby to determine the acceptability of the solder bond.

2. The method of claim 1 wherein the range of frequencies falls between about 20 hz and 1 Mhz.

3. The method of claim 2 wherein the acoustic vibrations are swept through a frequency range of about 150 khz–650 khz.

4. The method of claim 1 wherein the range of frequencies includes at least two natural resonant frequencies of the solder joint.

5. The method of claim 1 wherein the acoustic vibrations are applied to the first conductor or the solder joint and are received from the second conductor.

6. The method of claim 1 wherein the acoustic vibrations are applied to the first conductor or the solder joint and are received from the first conductor or the solder joint.

7. The method of claim 6 wherein the acoustic vibrations are both applied and received by the receiving transducer.

* * * * *